(12) United States Patent  
Kruckemyer et al.

(10) Patent No.: US 12,026,095 B2  
(45) Date of Patent: *Jul. 2, 2024

(54) CACHE COHERENT SYSTEM IMPLEMENTING VICTIM BUFFERS

(71) Applicant: ARTERIS, INC., Campbell, CA (US)

(72) Inventors: David A. Kruckemyer, San Jose, CA (US); Craig Stephen Forrest, San Francisco, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,743

(22) Filed: Nov. 21, 2022

(65) Prior Publication Data

US 2023/0079078 A1   Mar. 16, 2023

Related U.S. Application Data

(63) Continuation of application No. 16/234,572, filed on Dec. 28, 2018, now Pat. No. 11,507,510, which is a continuation of application No. 15/603,040, filed on May 23, 2017, now Pat. No. 10,255,183, which is a continuation of application No. 14/806,786, filed on Jul. 23, 2015, now abandoned.

(60) Provisional application No. 62/340,297, filed on May 23, 2016, provisional application No. 62/098,315, filed on Dec. 30, 2014.

(51) Int. Cl.
  *G06F 12/0815* (2016.01)
  *G06F 12/0817* (2016.01)

(52) U.S. Cl.
  CPC ...... *G06F 12/0815* (2013.01); *G06F 12/0817* (2013.01); *G06F 2212/1032* (2013.01); *G06F 2212/621* (2013.01)

(58) Field of Classification Search
  CPC ............ G06F 12/0815; G06F 12/0817; G06F 2212/1032; G06F 2212/621
  See application file for complete search history.

(56) References Cited

U.S. PATENT DOCUMENTS

| | | |
|---|---|---|
| 5,146,603 A | 9/1992 | Frost et al. |
| 5,226,144 A | 7/1993 | Moriwaki et al. |
| 5,659,710 A | 8/1997 | Sherman et al. |
| 5,893,120 A | 4/1999 | Nemes |
| 5,944,815 A * | 8/1999 | Witt ............... G06F 9/383 711/E12.07 |
| 6,065,077 A | 5/2000 | Fu |
| 6,275,900 B1 | 8/2001 | Liberty |
| 6,321,304 B1 | 11/2001 | James |
| 6,324,622 B1 | 11/2001 | Okpisz et al. |
| 8,862,801 B2 | 10/2014 | Saripalli |
| 9,690,699 B1 | 6/2017 | Nemes |
| 2002/0129211 A1 | 9/2002 | Arimilli et al. |
| 2003/0018739 A1 | 1/2003 | Cypher et al. |
| 2003/0135696 A1 | 7/2003 | Rankin et al. |

(Continued)

*Primary Examiner* — Mark A Giardino, Jr.

(74) *Attorney, Agent, or Firm* — Jubin Dana; Dana Legal Services

(57) ABSTRACT

In accordance with various aspects of the invention, a recall transaction is issued if a tag filter entry needs to be freed up for an incoming transaction. Directory entries chosen for a recall transaction are pushed into a fully associative structure called victim buffer. If this structure gets full, then an entry is selected from entries inside the victim buffer for the recall.

5 Claims, 3 Drawing Sheets

(56) References Cited

U.S. PATENT DOCUMENTS

| | | |
|---|---|---|
| 2004/0111563 A1 | 6/2004 | Edirisooriya et al. |
| 2004/0210721 A1 | 10/2004 | Detjens et al. |
| 2005/0160230 A1 | 7/2005 | Van Doren et al. |
| 2005/0172080 A1* | 8/2005 | Miyauchi .............. G06F 12/121 711/119 |
| 2007/0106847 A1* | 5/2007 | Bonwick ............... G06F 12/122 711/E12.071 |
| 2009/0089510 A1 | 4/2009 | Lee et al. |
| 2009/0276579 A1 | 11/2009 | Moyer |
| 2011/0173363 A1 | 7/2011 | Conti et al. |
| 2013/0111139 A1 | 5/2013 | Balakrishnan et al. |
| 2014/0095808 A1 | 4/2014 | Moll et al. |
| 2014/0281336 A1 | 9/2014 | Solihin |
| 2015/0046677 A1 | 2/2015 | Moloney et al. |

* cited by examiner

Entry Storage Structure

Pointer Management Structure

CACHE COHERENT SYSTEM IMPLEMENTING VICTIM BUFFERS

CROSS REFERENCE TO RELATED APPLICATIONS

This application is a continuation of U.S. Non-Provisional application Ser. No. 16/234,572 which was filed on Dec. 28, 2018 entitled METHOD FOR USING VICTIM BUFFER IN CACHE COHERENT SYSTEMS which is a continuation of U.S. Non-Provisional application Ser. No. 15/603,040 filed on May 23, 2017 and entitled VICTIM BUFFER FOR CACHE COHERENT SYSTEMS by Craig Stephen FORREST et al. Ser. No. 15/603,040 claims benefit of U.S. Provisional Application Ser. No. 62/340,297 filed on May 23, 2016 and is also a continuation of U.S. Non-Provisional application Ser. No. 14/806,786 filed on Jul. 23, 2017, which claims benefit of U.S. Provisional 62/098,315 filed on Dec. 30, 2014, the entire disclosures of which are incorporated herein by reference.

TECHNICAL FIELD

The invention is in the field of cache coherence systems and, more specifically, for system-on-chip designs.

BACKGROUND

Since computer processors with caches were first combined into multiprocessor systems there has been a need for cache coherence. More recently cache coherent multiprocessor systems have been implemented in systems-on-chips (SoCs). The cache coherent systems in SoCs comprise instances of processor intellectual properties (IPs), memory controller IPs, and cache coherent system IPs connecting the processors and memory controllers. More recently some SoCs integrate other agent IPs having coherent caches, such as graphics processing units, into heterogeneous multiprocessor systems. Such systems comprise a single centralized monolithic cache coherent system IP.

In the physical design of such SoCs, the centralized cache coherent system IP is a hub of connectivity. Wires connect transaction interfaces of each agent with the coherence system IP and from that to the memory controller IP. Such an arrangement causes an area of significant congestion for wire routing during the physical design phase of the chip design process.

SUMMARY

The invention involves a cache coherence system. In accordance with various aspects of the invention, an agent may be associated with a tag filter or null filter. In accordance with various aspects of the invention, a recall transaction is issued if a tag filter entry needs to be freed up for an incoming transaction. With victim buffers, directory entry chosen for a recall transaction is pushed into a fully associative structure called victim buffer. If this structure gets full, then an entry is selected from entries inside the victim buffer for the recall.

DETAILED DESCRIPTION

To the extent that the terms "including", "includes", "having", "has", "with", or variants thereof are used in either the detailed description and the claims, such terms are intended to be inclusive in a similar manner to the term "comprising". The invention is described in accordance with the aspects and embodiments in the following description with reference to the figures, in which like numbers represent the same or similar elements. Reference throughout this specification to "one embodiment," "an embodiment," or similar language means that a particular feature, structure, or characteristic described in connection with the various aspects and embodiments are included in at least one embodiment of the invention. Thus, appearances of the phrases "in one embodiment," "in an embodiment," "in certain embodiments," and similar language throughout this specification refer to the various aspects and embodiments of the invention. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

Figure 1:
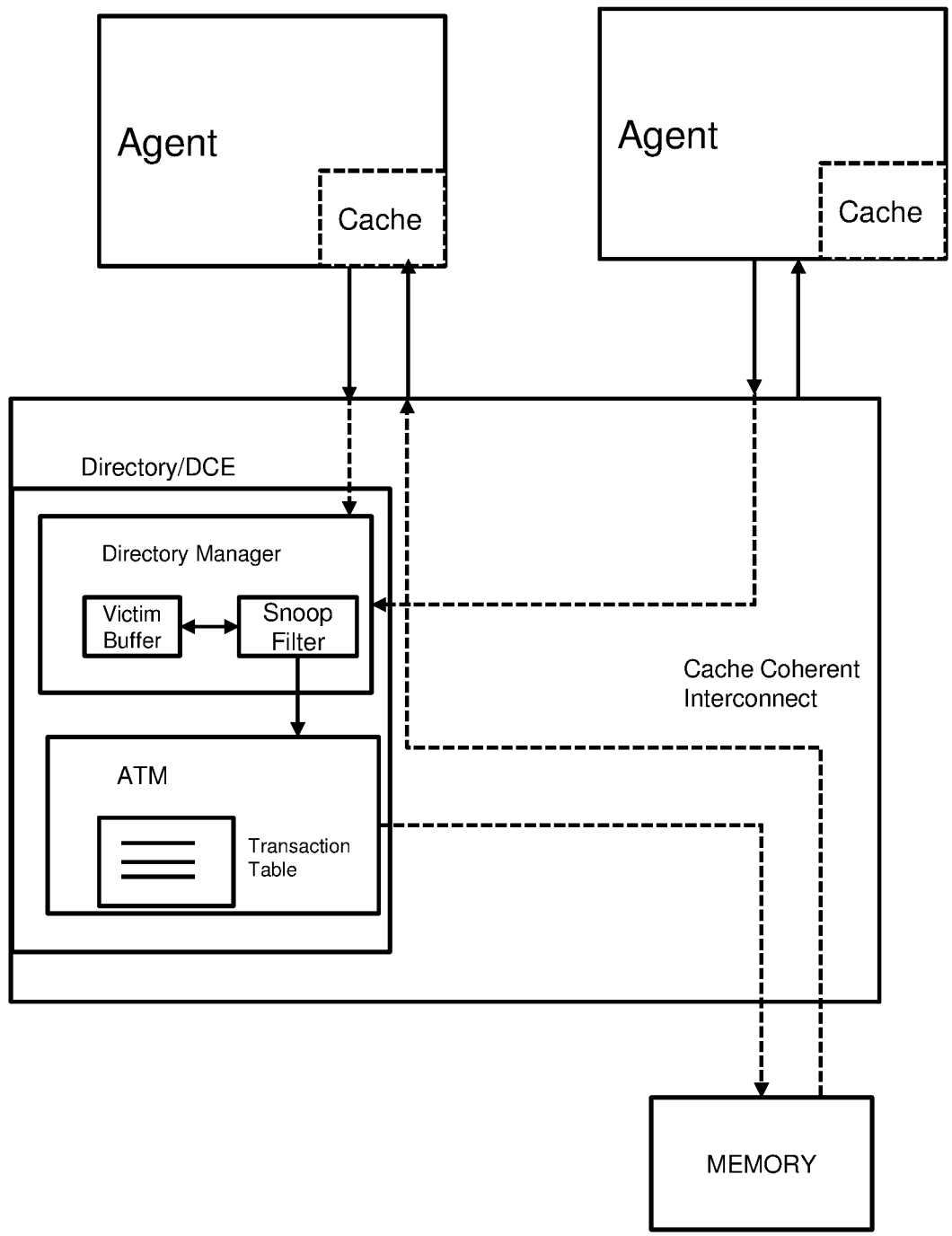
FIG. 1 illustrates a system in accordance with the various aspects of the invention.
Figure 2:
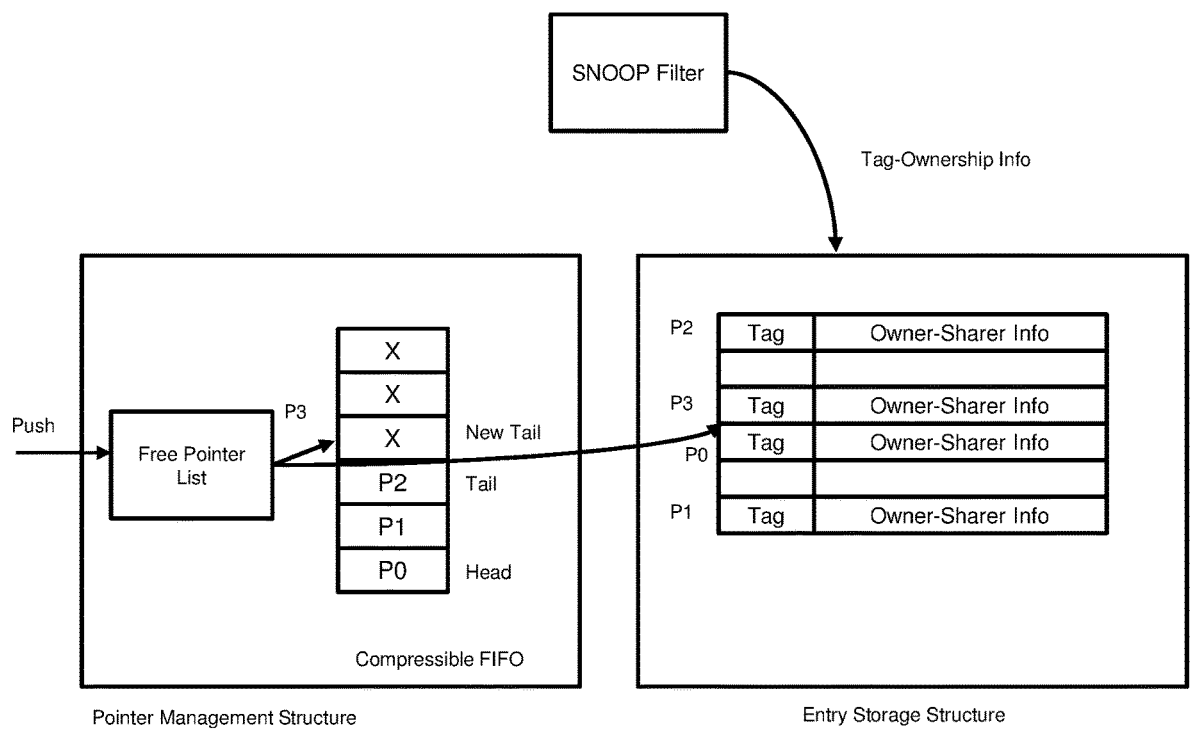
FIG. 2 illustrates a pointer management structure of the system of FIG. 1 in accordance with the various aspects of the invention.
Figure 3:
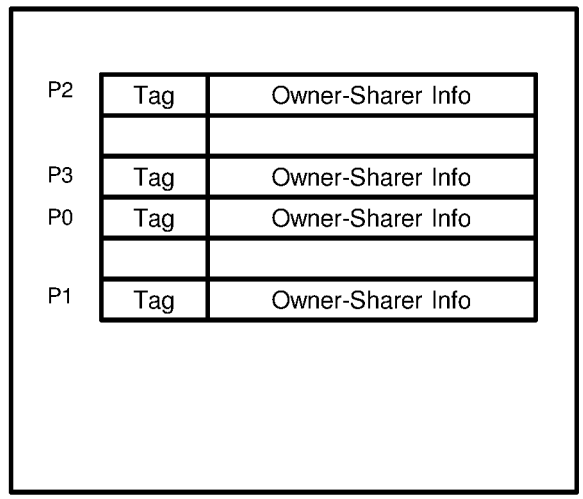
FIG. 3 illustrates a pointer management structure of the system of FIG. 1 in accordance with the various aspects of the invention.
Figure 3:
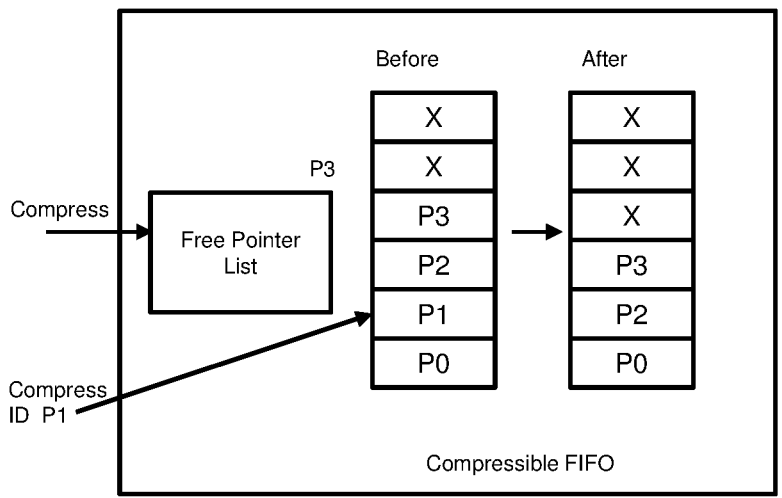

Referring to FIG. 1, FIG. 2, and FIG. 3, a distributed Coherence Enforcement (DCE) directory manager (or Directory or Snoop Filter) maintains cache states of all the agents it is tracking. An agent may be associated with a tag filter or null filter. In accordance with various aspects of the invention, a recall transaction is issued if a tag filter entry needs to be freed up for an incoming transaction. With victim buffers, a directory entry chosen for a recall transaction is pushed into a fully associative structure called victim buffer. If this structure gets full, then an entry is selected from entries inside the victim buffer for the recall.

In accordance with various aspects of the invention, a victim buffer is a memory to store snoop filter entries that have recently been evicted. Furthermore, a victim buffer is configurable based on user needs and includes address/tag or information about agents that share the data and agents that own the data. A victim buffer is associated with each tag filter. A transaction looks up tag filter array. Tag comparison is done in the following state. Parameters that will be considered here is a number of victim buffers associated with a tag filter. In accordance with various aspects of the invention, victim buffers are implemented as flip-flops. So, no error protection is added for victim buffers. In accordance with further aspects of the invention, victim buffers can be read just like transaction table if debug is enabled, as noted below.

Lookup address is matched with addresses in victim buffer and the tag filter. Directory response to the Active Transaction Manager (ATM) is generated combining victim buffer results with the tag filter results. The ATM includes a transaction table in the directory and can handle memory and state information for all current transaction. In accordance with various aspects of the invention, there are currently up to 96 entries. However, the scope of the invention is not limited by the size, which can be varied as needed or as dictated by the system limitations. Victim buffer access and comparison is done in P1 stage of the pipeline. Victim Buffer modification is done in P2 stage of directory pipeline.

For an incoming command, which doesn't have a match in a tag filter, and if allocation is required, then the DCE directory allocates a way in the tag filter. If the allocated way is a valid way, directory entry stored in that way is pushed in the victim buffer. A recall transaction is issued only in case the victim buffer is full and there is a need to put an entry in the victim buffer; it is not a victim buffer hit. The recall entry is selected from the head of the victim buffer.

In case of victim buffer hit on a Command lookup, the entry needs to be swapped with the entry from a tag filter. This needs to be done for all the tag filters for which victim buffer hit happens irrespective of if the tag filter is being associated with the requesting agent or not. So, if a swap is happening, then the system initiates a write entry from the victim buffer to tag array at the same cycle P2 (array write in P3 stage). If ways are available (a way being invalid) in the tag filter, then swap will not need to push an entry to the victim buffer. If all ways are valid, then swap will involve pushing an entry from tag filter ways to the victim buffer.

In case of a swap, the ATM is informed that the way being used for that transaction using dir_way interface. For update messages, if it hits a victim buffer, directory state is updated in place and if it results in invalidating entry; the system compresses the victim buffer around it by mechanisms explained herein.

For an update if it hits the tag filter and it invalidates Tag Filter entry, then the oldest entry from victim buffer from the same index is swapped back from victim buffer to the tag filter. Recall all and recall by index-way maintenance operations bypass the victim buffer. So behavior is similar with and without victim buffer. Recall all operation at the end calls recall victim buffer operation if it exists. Recall Victim buffer operation is newly added. If recall by address transaction hits victim buffer, that specific entry is selected for recall and victim is compressed around that entry.

Victim Buffer is implemented in the directory manager of the DCE. Victim buffer is comprised of 2 structures. Directory entry storage structure and Pointer management structure. Pointer management structure handles victim buffer push and pop control and relative age order among the victim buffer entries. Victim Buffer pointer structure has 2 interfaces:

Push interface: push input to add new entry to tail and push_pointer output to address victim buffer directory entry storage structure.

Compress interface: compress interface to compress around pointers if entry gets removed from victim buffer either due to victim buffer hit or an update request.

The implementation of this structure is divided into 2 parts.

1. Free list manager: It provides a free pointer on every push which is provided to the compressible FIFO and storage structure. On every compress request a pointer is reclaimed by free list manager.
2. Compressible FIFO: compressible FIFO manages age ordering between pointers. When pointer in the middle on the FIFO gets compressed, it changes age ordering between pointers by compressing around pointers getting removed.

If the current pointer ordering is a->b->c->d. If the system has to compress around b, then the new order will look like a->c->d after compressing around pointer b.

Implementation of the compressible FIFO: each pointer is linked to other pointer as shift register. Adding pointer to tail is done by writing to register, which is just before last valid register in the shift register. Removing the head pointer is achieved by doing a shift operation on all the shift registers. Similarly compressing around a middle entry is done by shifting registers, which appear prior to the register, to compress on. For example, for a list a->b->c->d, if the system compresses on the pointer c, then it would shift a, b overwriting c. So, the list looks like a->b->d.

With each pointer, the system also stores the index, to which the pointer is associated with. While shifting pointers with mechanism mentioned above, the system also shifts indexes with the pointers. These indexes are used to determine victim buffer location to swapped in case of tag filter update hit results in invalidating the tag filter. Behavior of DCE and victim buffer is shown in the table below for possible input conditions.

TABLE 1

| | Lookup | | | | | | | | | | |
|---|---|---|---|---|---|---|---|---|---|---|---|
| CMDReq | Victim Buffer Present | Tag Filter Hit | Victim Buffer Hit | Tag Filter ways full | Victim Buffer Full | Swap | Compress Victim Buffer | Victim Buffer Push | Victim buffer Pop | Recall | Recall Entry Source |
| CmdRdUnq | Yes | Yes | No | X | X | No | No | No | No | No | N/A |
| CmdRdCln | | No | Yes | Yes | X | Yes | Yes | Yes | No | No | N/A |
| CmdRdVld | | | | No | X | Yes | Yes | No | No | No | N/A |
| CmdClnUnq | | | No | Yes | Yes | No | No | Yes | Yes | Yes | Victim Buffer |
| | | | | No | No | No | No | Yes | No | No | N/A |
| | | | | No | X | No | No | No | No | No | N/A |
| | No | Yes | No | X | X | N/A | N/A | N/A | N/A | | N/A |
| | | No | No | Yes | X | N/A | N/A | N/A | N/A | Yes | Tag Filter |
| | | | | No | X | N/A | N/A | N/A | N/A | No | N/A |

TABLE 2

Maintenance Operations

| CMDReq | Victim Buffer Present | Tag Filter Hit | Victim Buffer Hit | Tag Filter ways full | Victim Buffer Full | Swap | Compress | Victim Buffer Push | Victim buffer Pop | Recall | Recall Entry Source |
|---|---|---|---|---|---|---|---|---|---|---|---|
| Recall By Address | Yes/No | Yes | No | X | X | No | No | No | No | Yes | Tag Filter |
|  |  | No | Yes | X | X | No | Yes | No | No | Yes | Victim Buffer |
| Recall by index way | Yes/No | Yes | No | X | X | No | No | No | No | Yes | Tag Filter |
| Recall all Recall victim buffer |  | X | X | X | X | No | No | No | Yes | Yes | Victim Buffer |

TABLE 3

Updates

| CMDReq | Victim Buffer Present | Tag Filter Hit | Victim Buffer Hit | Tag Filter ways full | Victim Buffer Full | Swap | Compress | Victim Buffer Push | Victim buffer Pop | Recall | Recall Entry Source |
|---|---|---|---|---|---|---|---|---|---|---|---|
| UpInv | X | Yes | No | X | X | Maybe | Maybe | No | No | No | N/A |
|  | Yes | No | Yes | X | X | No | No | No | No | No | N/A |

The ranges of values provided above do not limit the scope of the present invention. It is understood that each intervening value, between the upper and lower limit of that range and any other stated or intervening value in that stated range, is encompassed within the scope of the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Some embodiments of the invention include a firewall unit in the transport topology. A firewall unit moots transaction requests with certain characteristics, such as a particular address range or a particular target unit.

Some embodiments of the invention include a buffer in the transport topology. A buffer can store a number of requests or responses in transit between functional units. One type of a buffer is a FIFO. Another type of buffer is a rate adapter, which stores partial data bursts.

Unless defined otherwise, all technical and scientific terms used herein have the same meaning as commonly understood by one of ordinary skill in the art to which this invention belongs. The verb couple, its gerundial forms, and other variants, should be understood to refer to either direct connections or operative manners of interaction between elements of the invention through one or more intermediating elements, whether or not any such intermediating element is recited. Any methods and materials similar or equivalent to those described herein can also be used in the practice of the invention. Representative illustrative methods and materials are also described.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teaching of the invention a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Therefore, the scope of the invention, is not intended to be limited to the various aspects and embodiments discussed and described herein. Rather, the scope and spirit of invention is embodied by the appended claims.

What is claimed is:

1. A method for managing a directory that handles transactions, the method comprising:
   allocating a way in a tag filter for an incoming transaction;
   configuring a victim buffer to store snoop filter entries that have been recently evicted from the tag filter, wherein the victim buffer is accessed in one pipeline stage, during which error protection is performed, and the victim buffer is modified in another pipeline stage;
   selecting an entry in the victim buffer for a recall transaction when the way in the tag filter is valid and the victim buffer is full;
   removing the selected entry in the victim buffer to free up a way in the victim buffer for an incoming valid way from the tag filter;
   reclaiming, at a free list manager, a pointer entry when the selected entry from the victim buffer is removed;
   altering, at a pointer management structure, age ordering of the victim buffer's entries; and
   pushing the valid way in the tag filter to the victim buffer, thereby freeing up one way in the tag filter for the incoming transaction.

2. The method of claim 1, wherein the victim buffer includes information about owner agents and share agents.

3. A method comprising:
   receiving a command at a directory and identifying if the command has a hit in a tag filter;
   determining if allocation of a way in the tag filter is required when the command does not have a match in the tag filter;
   selecting a way, if allocation of a way is required, in the tag filter;
   determining if the way in the tag filter is valid;
   identifying if the command is a hit to an entry in a victim buffer;
   swapping, if the command is a hit in the victim buffer and does not have a match in the tag filter, the hit entry in the victim buffer with the valid way in the tag filter by a write command from the victim buffer's hit entry to the tag filter and a push command from the valid way in the tag filter to a valid entry location in the victim buffer; and
   compressing around a pointer of the victim buffer if a victim buffer entry gets removed from the victim buffer, wherein accessing the victim buffer is done in one pipeline stage and modifying the victim buffer is done in another pipeline stage.

4. The method of claim 3 further comprising updating a pointer manager of the victim buffer.

5. A system comprising:
   at least one processor;
   at least one directory;
   at least one victim buffer;
   memory, which is coherent, in communication with the processor,
   wherein the memory stores code that is executed by the processor to cause the system to:
      receive a command at the directory;
      determine if the command is a hit for a victim buffer entry in the victim buffer, wherein accessing the victim buffer is done in one pipeline stage and modifying the victim buffer is done is another pipeline stage;
      initiate a write entry from the victim buffer's way to a way of a tag filter;
      determine if all of a plurality of ways of the tag filter are valid;
      move, when at least one way of the plurality of ways in the tag filter is invalid, the victim buffer entry to the tag filter entry with the invalid way without pushing the invalid way's entry to the victim buffer;
      swap, when all of the plurality of ways in the tag filter are valid, the victim buffer entry with one way selected from the plurality of ways in the tag filter by pushing the selected way's entry of the tag filter to the victim buffer and writing the victim buffer entry to the selected way of the tag filter; and
      compress around a pointer when a victim buffer entry gets moved from the victim buffer to the invalid way of the tag filter.

\* \* \* \* \*